United States Patent [19]

Austin et al.

[11] Patent Number: 5,022,726
[45] Date of Patent: Jun. 11, 1991

[54] MAGNESIUM FILM REFLECTORS

[75] Inventors: Russell Austin, Novato, Calif.; Eric R. Dickey, Northfield, Minn.

[73] Assignee: Viratec Thin Films, Inc., Faribault, Minn.

[21] Appl. No.: 454,749

[22] Filed: Dec. 20, 1989

[51] Int. Cl.⁵ ............................................. G02B 5/26
[52] U.S. Cl. ..................................... 350/1.7; 350/692
[58] Field of Search ................. 350/1.7, 600, 601, 692

[56] References Cited

U.S. PATENT DOCUMENTS 2,058,429 10/1936 Edwards ............................. 350/600
4,955,705 9/1990 Nakajima et al. .................... 350/692

FOREIGN PATENT DOCUMENTS

3005621 8/1981 Fed. Rep. of Germany ...... 350/692
1131624 5/1989 Japan ................................. 350/692

Primary Examiner—Bruce Y. Arnold
Assistant Examiner—J. P. Ryan
Attorney, Agent, or Firm—Flehr, Hohbach, Test, Albritton & Herbert

[57] ABSTRACT

The present invention is directed to the use of magnesium films in reflectors and low emissivity coatings.

10 Claims, 6 Drawing Sheets

MAGNESIUM FILM REFLECTORS

BACKGROUND OF THE INVENTION

1. Field of the Invention

The present invention relates generally to high reflectivity reflectors, and more particularly to magnesium reflectors.

There are many optical systems in which light undergoes multiple reflections from the source or input stage to the detector or processor stage. Examples are cameras and document copiers. In these systems, it is desirable to provide reflecting surfaces having the highest possible reflectivity across the visible spectrum, i.e., from a wavelength of about 425 nanometers (nm) to 675 nm. As many of these optical systems are found in consumer products, such reflectors are preferably inexpensive and capable of maintaining their high reflectance value for several years, generally in an uncontrolled environment.

2. Description of the Prior Art

Metal Film Reflectors

The most common mirrors or reflectors are formed from thermally-evaporated films of silver or aluminum. In their freshly-deposited state, the reflectivity of these films throughout the visible spectrum is relatively high. The reflectance value for a silver reflector ranges from a low of 93.9 percent at a wavelength of 400 nm to 98.7 percent at 700 nm. For aluminum film reflectors, the value is 92.6 percent at 400 nm, falling to 90.7 percent at 650 nm and 88.8 percent at 700 nm.

If such reflective surfaces are left unprotected, their reflectivity or reflectance value decreases sooner or later due to corrosion. Aluminum forms a self limiting oxide film which causes its reflectivity to fall to a certain level between about 85 and 89 percent at 520 nm, i.e. at the middle of the visible spectrum. Thereafter, it stabilizes. Silver films will continue to corrode until they turn black. Their appearance also becomes blotchy and mottled. A reflector may be protected by depositing a film of a transparent dielectric material on the reflection surface. This, however, will reduce reflectivity.

Common household mirrors, known as second surface reflectors, are protected because they are observed through a glass sheet. Thus, they may be protected by covering the mirror's exposed side, which is not observed, with paints, lacquers, or thick films of other metals. However, even silver films used in such second surface reflectors will eventually corrode. Thus, silver mirrors are not often used for common, household applications, although they are still used for special scientific or military applications. Aluminum is now frequently used in second surface mirrors.

Partially-transmitting, silver reflector films, deposited by sputtering, are also used as low emissivity coatings or deicing coatings. These films may be completely sealed in an insulated glass window cavity or in a laminated windshield assembly. Thus, the possibility of corrosion is greatly reduced.

Multilayer Dielectric Reflectors

Very high reflectivity reflectors can be produced by the deposition of multilayer dielectric interference stacks. These stacks comprise a number of transparent films of alternating high and low refractive index (n) materials wherein each film has a one-quarter wavelength optical thickness at a particular design wavelength. Mirrors for laser resonant cavities are produced in this manner. They can have reflectivity values as high as 99.9 percent at wavelengths near the red end of the visible spectrum. Their reflectivity value decreases at longer and shorter wavelengths. For instance, for a thirteen film structure having high refractive index films of n=2.35 and low refractive index films of n=1.38, all films having a one-quarter wavelength optical thickness at 500 nm, a value of 99 percent reflectivity or greater can be maintained only over a wavelength range of approximately 12 nm.

The reflectivity range can be extended by combining two or more stacks, with the stack thicknesses adjusted so that the effective reflection regions overlap and cover the entire visible spectrum. Typically, such reflectors require 25 or more films. However, these structures are uneconomical for large area applications.

Dielectric Enhanced Reflectors

Figure 1:
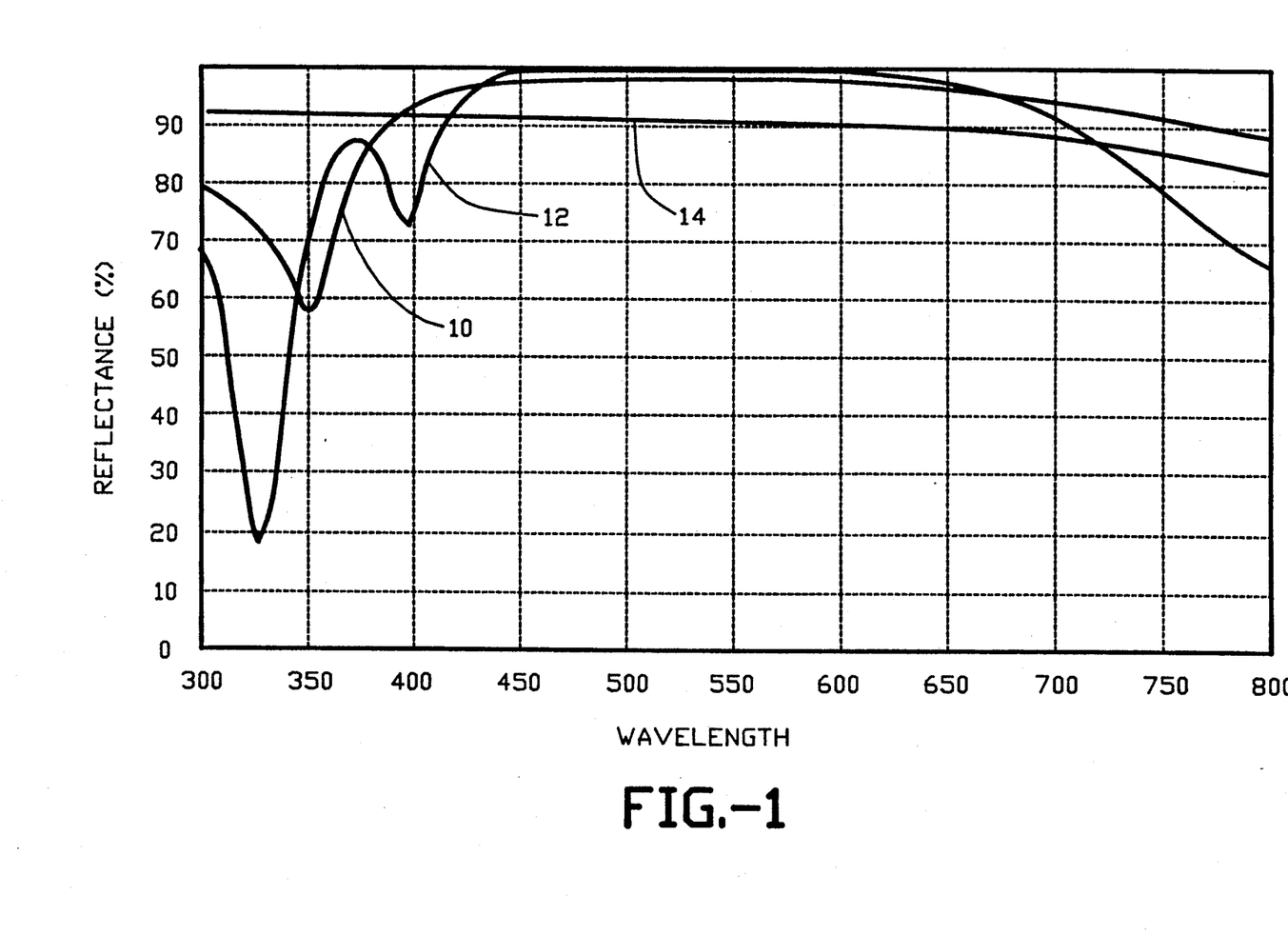
FIG. 1 is a graph illustrating the spectral response curves for enhanced aluminum reflectors having two and four dielectric layers.

The reflectivity of metals, particularly those having a very high reflectivity, can be significantly enhanced by the addition of as few as two transparent dielectric films. In such structures, the dielectric film next to the metal film has a low refractive index while the other dielectric film has a high refractive index. See Hass, "Filmed Surfaces for Reflecting Optics", 45 *J. Opt. Soc. Am.* 945-52, 195—). For example, the reflectivity of a freshly-deposited aluminum film may be increased from 91.6 to about 97 percent, at a wavelength of 550 nm, by the use of low refractive index layer, e.g. magnesium fluoride (n=1.38), and a high refractive index layer, e.g. titanium dioxide (n=2.35) or zinc sulfide. The addition of a second pair of high and low dielectric layers can boost the reflectivity value even further, e.g. to approximately 99 percent. However, the cost of the structure also increases. Further, the bandwidth of the high reflectivity zone becomes limited, as previously described. Indeed, outside the zone of high reflectivity, the reflectivity is less than that of the bare metal film. This is illustrated in FIG. 1 which shows the spectral response curves for aluminum reflectors having two (curve 10) and four (curve 12) dielectric layers. The reflectivity of bare aluminum (curve 14) is shown for comparison. The designs of the enhanced structures of FIG. 1 are shown in Table 1.

TABLE 1

| Layer No. | Refractive Index | Optical Thickness (at λ = 500 nm) |
|---|---|---|
| | Two Dielectric Layers | |
| 1 | 2.35 | 0.264 λ |
| 2 | 1.38 | 0.233 λ |
| 3 | Aluminum | Opaque (> 150 nm thick) |
| | Four Dielectric Layers | |
| 1 | 2.35 | 0.255 λ |
| 2 | 1.38 | 0.271 λ |
| 3 | 2.35 | 0.261 λ |
| 4 | 1.38 | 0.229 λ |
| 5 | Aluminum | Opaque (> 150 nm thick) |

It is believed that most front surface enhanced reflectors include aluminum enhanced by one dielectric layer pair. Higher quality mirrors are also made that include an aluminum film enhanced by two dielectric layer pairs. One dielectric layer pair enhanced mirrors generally have a reflectivity of about 94 percent between 425 nm and 675 nm. Two dielectric layer pair enhanced mirrors have a reflectivity greater than 97 percent in the same wavelength range.

Higher reflectance values for a given enhancement can be obtained if silver is used as the base film. However, due to its cost and corrosion problems, silver-based enhanced reflectors are generally undesirable.

A more detailed description of these devices and their design techniques are given in *Thin Film Optical Filters*, MacLeod, 2d. ed., Ch. 4, pp. 138–46; Ch. 5, pp. 164–79 (1986).

Reflectance Values for Magnesium

The optical constants of bulk metals, including magnesium, were reported by Drude in 39 *Ann. Physik.* 481 (1890). The measurements are at one wavelength only, 589 nm, the sodium "D" lines. For magnesium, they show a reflectivity of 93.1 percent at that wavelength.

The reflectivity values for evaporated magnesium films in the visible spectral range were first reported by O'Bryan in 26 *J. Opt. Soc. Am.* 122 (1936). These values range from 68 percent at a wavelength of 405 nm to 88 percent at a wavelength of 578 nm. See also the *American Institute of Physics ("AIP") Handbook*, 3rd. ed., Ch. 6, pp. 124–55 (1982), which is used by many practitioners in the optical thin film art as a source of optical constants for metals. These values indicate that evaporated magnesium is unsuitable for high reflectivity reflectors. Specifically, a high reflectivity reflector should have a reflectance value of at least in excess of about 90 percent across the visible spectrum.

A general object of the present invention is to provide a reflector that has a reflectivity and transparency greater than a aluminum reflector. A more specific object of the present invention is to provide a reflector having at least one layer of magnesium and a reflectivity across the visible spectrum of at least about 92 percent.

SUMMARY OF THE INVENTION

The present invention is directed to a reflector comprising at least one layer of material including at least about 90 percent magnesium. The reflector has a reflectivity of at least about 92 percent across the visible spectrum. The layer of material defines a light reflecting surface.

The present invention is also directed to a transparent, infrared reflecting composite film comprising a transparent metal layer-dielectric layer filter. The metal layer is at least about 90 percent magnesium and has a reflectivity value of at least 92 percent across the visible spectrum.

The magnesium metal layer may be deposited by DC magnetron sputtering in an inert gas atmosphere such as pure argon gas. The reflectivity of the magnesium layer across the visible spectrum is significantly greater than that of aluminum. The magnesium layer is thus second only to silver in its visible reflecting properties. However, it is more durable than silver.

DETAILED DESCRIPTION OF THE PREFERRED EMBODIMENTS

Films of the pure magnesium metal were sputtered in an inert atmosphere of pure argon gas. The reflectivity of these films was measured against new National Bureau of Standards (NBS) standard aluminum films, and it was found that the reflectivity of the magnesium films was considerably higher than the aluminum films over most of the visible spectrum. The results of these measurements are shown by the spectral response curves of FIG. 2. Curve 18 shows the reflectivity of the bare NBS standard aluminum film, and curve 20 shows the freshly-sputtered bare magnesium film.

Figure 2:
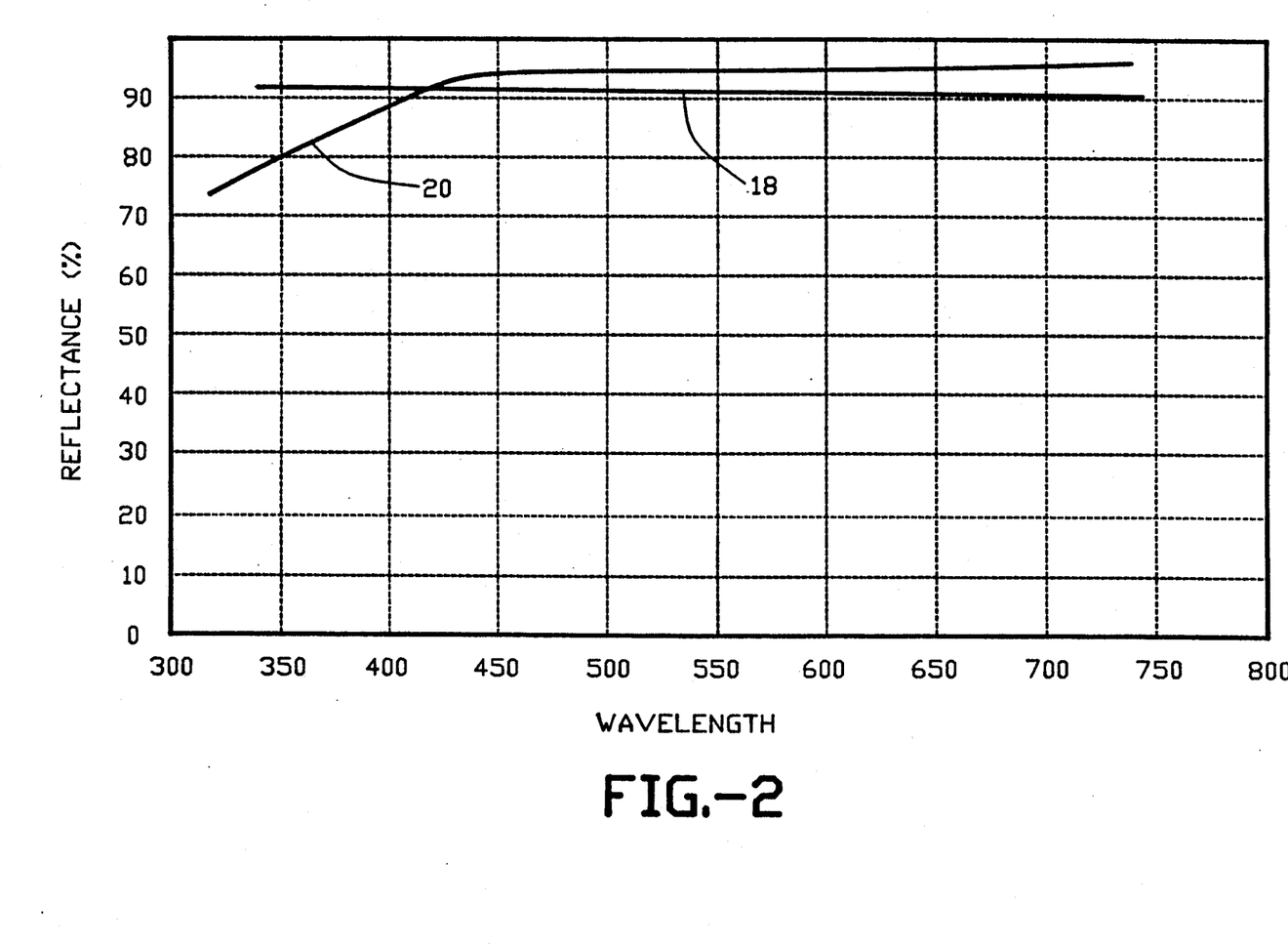
FIG. 2 is a graph illustrating the spectral response of bare NBS standard aluminum and a freshly-sputtered bare magnesium film in accordance with the present invention.

As can be seen from these measurements, the reflectivity of the magnesium film approaches 95 percent in the middle of the visible spectrum. This is higher than the value reported by Drude, discussed above, for polished magnesium metal.

In order to determine the optical properties of the magnesium films, two magnesium films, one approximately 9 nm thick and the other approximately 220 nm thick, were deposited on a glass substrate. These films were sufficiently thin so as to be transparent to visible light as well as reflective. The optical constants of these films were determined by measuring the transmission and reflectance values. Using these values, the maximum reflectivity for an opaque magnesium film was calculated. The calculated values agreed with the measured values for the opaque magnesium film to within 0.5 percent at wavelengths between 400 and 700 nm. This confirmed that the high reflectivity that was measured was real to within the 0.5 percent accuracy. The optical constants and reflectivity values for the opaque magnesium film are shown in Table 2, along with the previously reported values by O'Bryan and Drude.

TABLE 2

| Wavelength (nm) | Optical Constants | | Maximum Reflectivity (%) |
| --- | --- | --- | --- |
| | n | k | |
| Results for DC Magnetron Sputtered Magnesium Films | | | |
| 400 | 0.34 | 3.75 | 91.42 |
| 440 | 0.29 | 4.18 | 93.94 |
| 480 | 0.31 | 4.60 | 94.58 |
| 520 | 0.37 | 5.02 | 94.53 |
| 560 | 0.43 | 5.43 | 94.54 |
| 600 | 0.49 | 5.85 | 94.62 |
| 640 | 0.56 | 6.26 | 94.61 |
| 680 | 0.61 | 6.67 | 94.82 |
| Values for Evaporated Magnesium Films AIP Handbook - O'Bryan | | | |
| 404.6 | 0.52 | 2.05 | 68.1 |
| 435.8 | 0.52 | 2.65 | 77.7 |
| 491.6 | 0.53 | 2.92 | 80.5 |
| 546.1 | 0.57 | 3.47 | 84.3 |
| 578.0 | 0.48 | 3.71 | 88.0 |
| Values for Bulk Magnesium AIP Handbook - Drude | | | |
| 589 | 0.37 | 4.42 | 93.1 |

The fact that the optical constants for the very thin magnesium films agreed with those of opaque films indicates that little or no oxidation of the magnesium was taking place during the deposition process.

As far as can be determined, there has not been a report in the literature which discloses or even suggests the optical properties of magnesium discussed above. The magnesium films of the present invention have a reflectivity across the visible spectrum significantly greater than that of aluminum. Their reflectivity approaches that of silver, which, previously, was believed to be the only metal with a reflectivity in the visible spectrum greater than aluminum.

The films of the present invention may be prepared in an Airco Coating Technology, Fairfield, California, "in line" sputtering system Model D1. This system is capable of coating substrates up to one meter wide and two meters long. In this system under normal operating conditions, the substrates being coated move continually under DC magnetron sputtering cathodes, which are the deposition sources. The magnesium films can be prepared under normal production conditions. Thus, large areas films can be produced at low cost.

The sputtering sources were formed by bonding tiles of the magnesium alloy AZ 31 B onto the copper backing plates of the cathodes. This alloy is about 94 percent magnesium and is commercially available from Plasmaterials, 10046 Nantucket Dr., San Ramon, Ca. It may contain up to 3 percent aluminum, 1 percent zinc and about 0.2 percent manganese. The use of this alloy is not believed to have any particular influence on the optical properties of the sputtered magnesium film, although it may influence the oxidation resistance of the film. Importantly, the magnesium content of any alloy used must be such that the resulting magnesium layer or film is at least about 90 percent pure magnesium.

The base pressure in the coating system was $5 \times 10^{-6}$ Torr. The sputtering pressure in the vicinity of the cathodes was $1.03 \times 10^{-3}$ Torr. The sputtering gas was argon and the gas flow rate gas was 90 standard cubic centimeters per minute (sccm). The power applied to the cathodes was 23 KW at a voltage of $-583$ V. Substrates being coated were moved past the cathodes at a line speed appropriate to yield the desired thickness.

A 600 nm thick film, which is thick enough to yield a full reflector, was deposited at the above conditions and at a line speed of 25 inches per minute. A 9 nm thick film was produced by reducing the power to 5 KW and increasing the line speed to 200 inches per minute.

Also, it is believed that similar results can be obtained by sputter depositing the magnesium by techniques other than DC magnetron sputtering such as by RF sputtering. Additionally, such results may be obtained by evaporating the films at extremely low pressures, i.e., less than $1 \times 10^{-7}$ Torr. This would prevent the magnesium from forming an oxide during the deposition process, thereby preventing low reflection values.

The magnesium films can be used as a substitute for aluminum or silver in reflecting film structures. The magnesium films can also be used in visibly-transparent, IR-reflecting structures, commonly called low emissivity (Low E) or solar control coatings.

As shown by FIG. 2, in a first surface reflector, the reflectivity of an unprotected magnesium film is higher than the NBS standard aluminum film. At a wavelength of 500 nm, the reflectivity is approximately 94.5 percent compared with aluminum at approximately 92 percent.

For second surface reflectors, it is expected that the reflection value from the glass to air surface for a magnesium film, deposited in accordance with the sputter techniques described above, will be about 92.2 percent. This is greater than aluminum which should have a reflectivity of about 88.6 percent as computed using the accepted optical properties of aluminum. The reflectivity of the magnesium film also compares favorably with silver which would have a second surface reflectivity of above 97.15 percent. These values are all at a wavelength of 500 nm.

Figure 3:
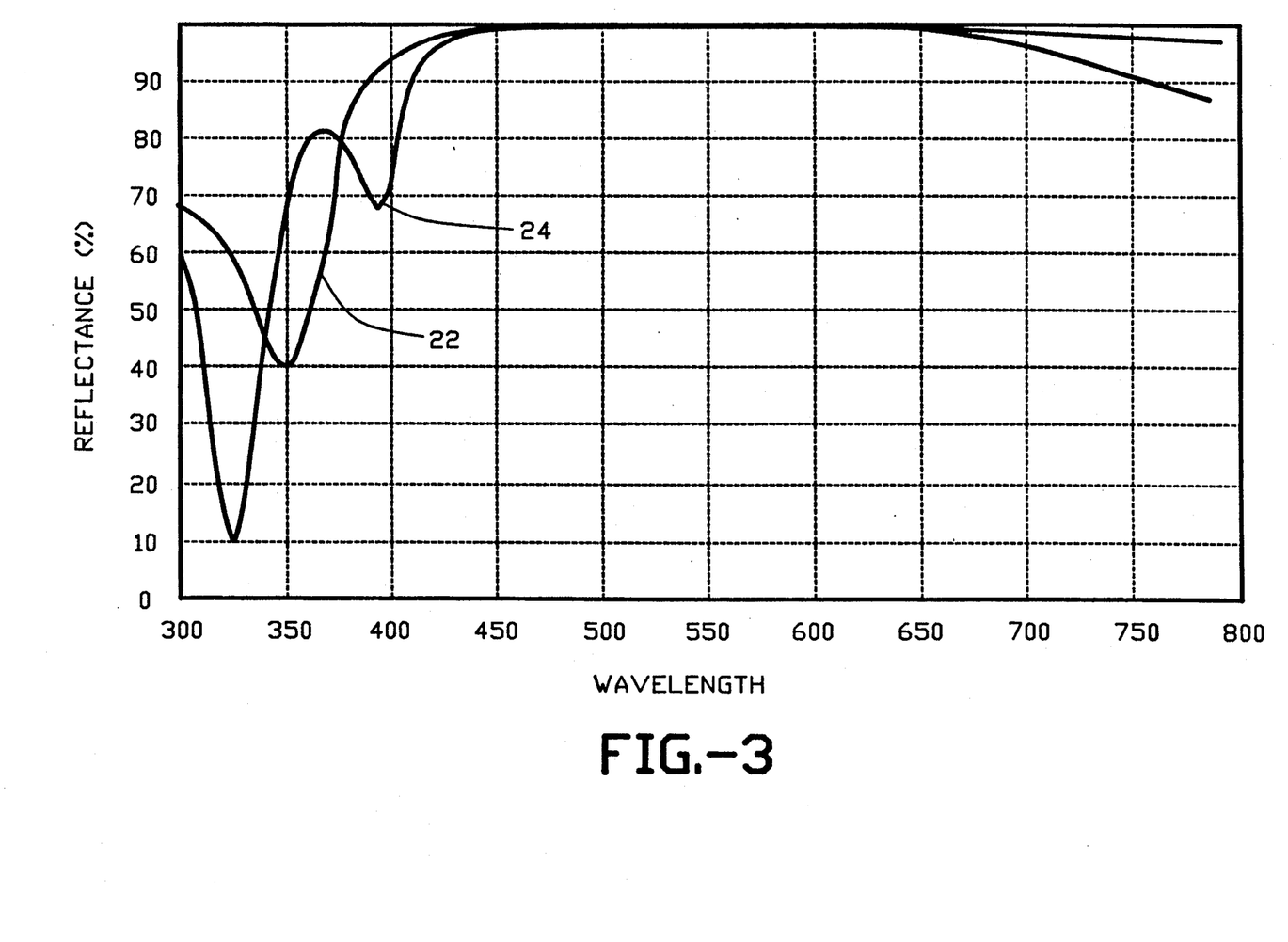
FIG. 3 is a graph illustrating the reflectance values for a magnesium film of the present invention enhanced by one and two dielectric layer pairs.

The performance of dielectric enhanced reflectors may also be improved by the use of magnesium films. FIG. 3 shows the values for magnesium films enhanced by one (curve 22) and two (curve 24) dielectric layer pairs. As can be seen by comparing this data with the data of FIG. 1, the reflectivity of the two dielectric layer enhanced magnesium reflector is almost the same as the four dielectric layer enhanced aluminum reflector.

The designs for the structures of FIG. 3 are shown in Table 3. The choice of the refractive index values is somewhat arbitrary. Other values could be substituted for one or more of the films to achieve the enhancement albeit with different thickness and slightly different results. Similarly, the thickness of the dielectric films may be modified to produce a different reflection response with wavelength.

TABLE 3

Magnesium Enhanced Reflectors
(Layers are numbered from the air boundary)

| Layer No. | Refractive Index | Optical Thickness (at $\lambda = 500$ nm) |
|---|---|---|
| | One Pair | |
| 1 | 2.35 | 0.259 $\lambda$ |
| 2 | 1.38 | 0.223 $\lambda$ |
| 3 | Magnesium | Opaque (> 150 nm thick) |
| | Two Pairs | |
| 1 | 2.35 | 0.251 $\lambda$ |
| 2 | 1.38 | 0.274 $\lambda$ |
| 3 | 2.35 | 0.248 $\lambda$ |
| 4 | 1.38 | 0.228 $\lambda$ |
| 5 | Magnesium | Opaque (> 150 nm thick) |

Figure 4:
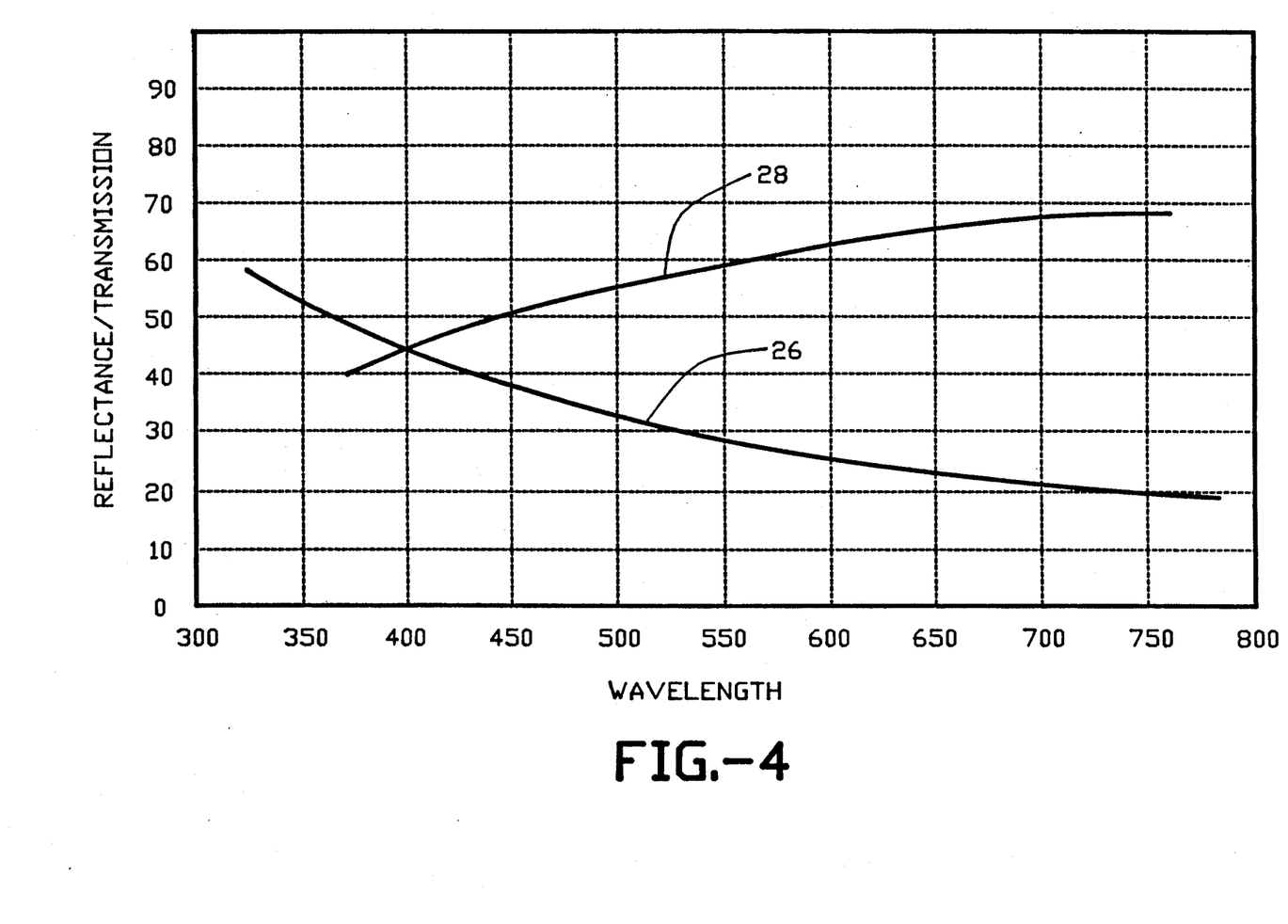
FIG. 4 shows the reflection and transmission values of a 90 nm thick magnesium film.

There is a further important implication of the present invention which relates to the low absorption of the sputtered magnesium film. One reason that the reflectivity of the magnesium film is significantly higher than aluminum is that the absorption of the magnesium film is significantly less than aluminum. Thus, not only are magnesium films highly reflective for applications where reflectivity in the visible spectrum is important, but in the form of thin films, they are also transparent in the same spectral region. This was verified experimentally, and the reflection (curve 26) and transmission (curve 28) responses of a 90 nm thick magnesium film are shown in FIG. 4.

This high transparency property in the visible spectrum is particularly useful in so-called low E systems for architectural applications. These are systems in which a thin, partially-transmitting, metal film, usually silver, is bounded on either side with dielectric layers to reduce visible reflection from the film and increase transparency. The metal film must be thick enough to be highly conductive and have a high reflectivity at infrared wavelengths so that it will reflect heat, for instance, back into a building where the low E coatings are deposited on windows. The design principles for this type of device are discussed by MacLeod in *Thin Film Optical Filters*, 2d. ed., Ch. 7, pp. 295-308 (1986).

Figure 5:
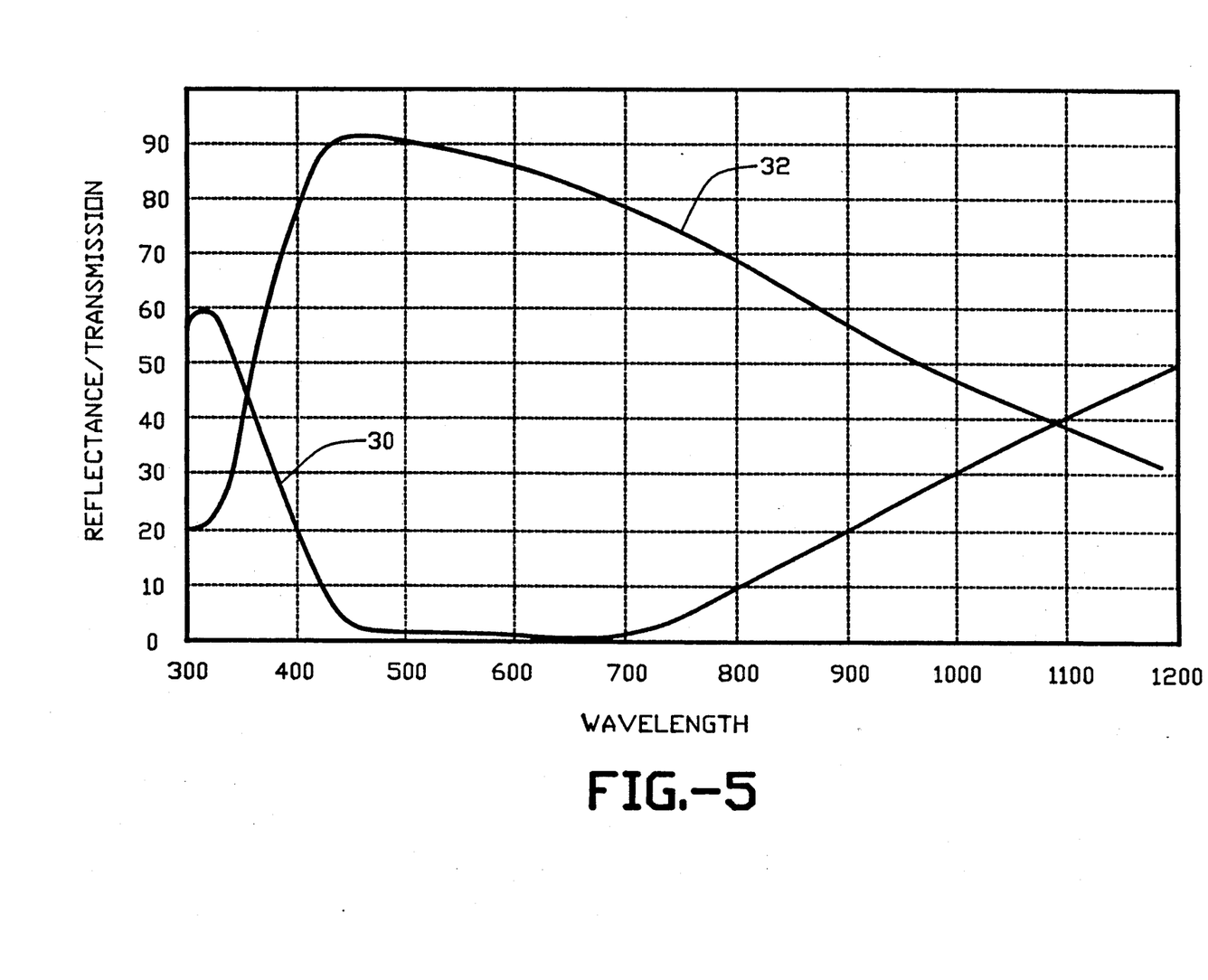
FIG. 5 shows the reflection and transmission response curves for a low E system using magnesium and titanium dioxide.
Figure 6:
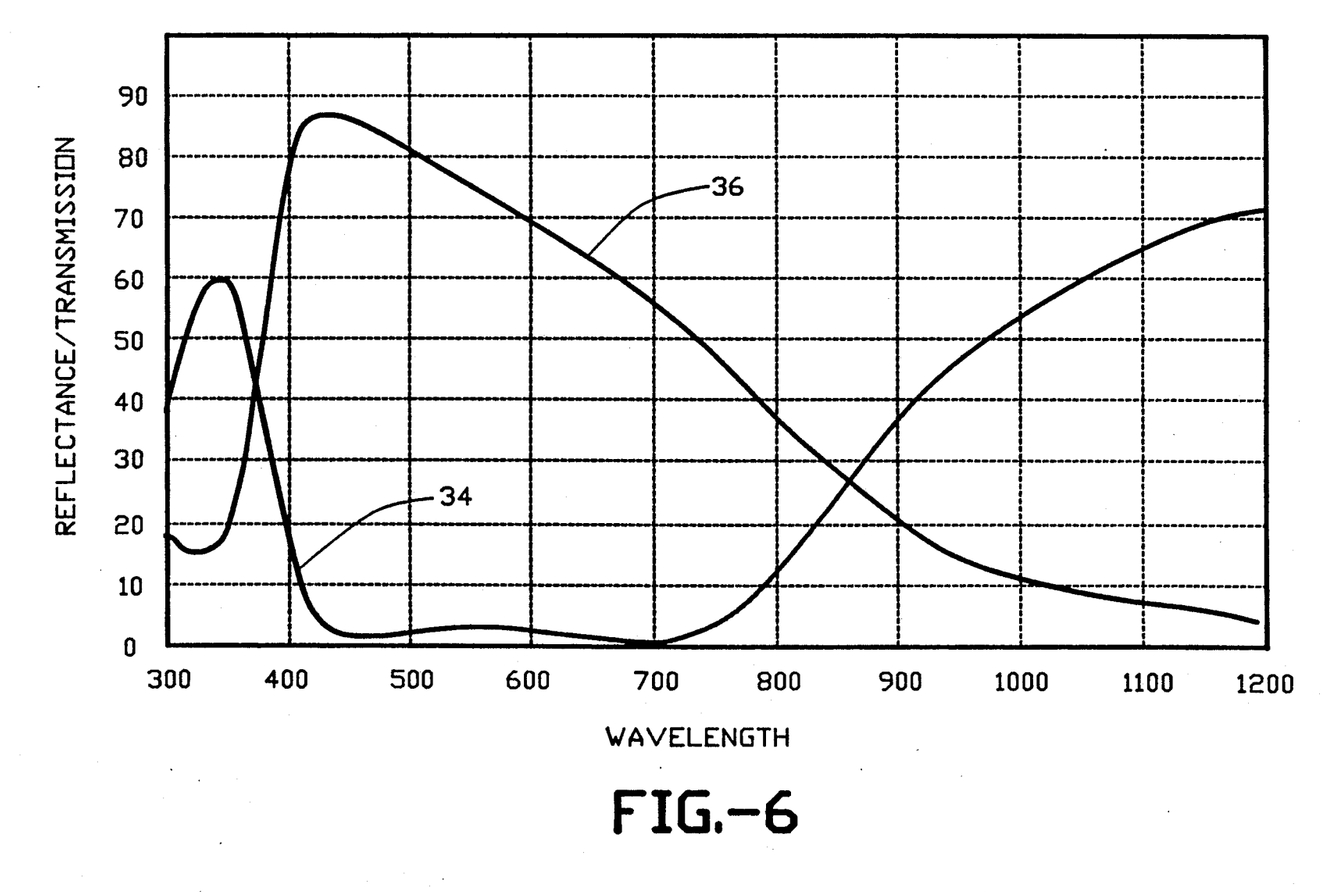
FIG. 6 shows the transmission and reflection response curves for a five layer low E system using magnesium and titanium dioxide.

Using the optical properties measured for magnesium films, the performance of a low E layer structures having one magnesium film have been computed, as represented in FIG. 5. Curve 30 is the reflection response curve and curve 32 is the transmission response curve. FIG. 6 shows the computed performance of structures with two magnesium films. Both the reflection and transmission response curves 34 and 36, respectively, are shown.

The designs of the structures of FIGS. 5 and 6 are shown in Table 4. The choice of titanium dioxide (TiO$_2$) as the dielectric material is somewhat arbitrary, and it is recognized that other dielectric materials with different refractive index values could be used singly or in combination such structures. Similarly, it is recognized that the thicknesses of the dielectric and metal films may be modified to produce different reflection and transmission responses with wavelength.

TABLE 4

Magnesium and Titanium Dioxide Low E Systems
(Layers are numbered from the air boundary)

| Layer No. | Material | Physical Thickness (nm) |
|---|---|---|
| | One Magnesium Film | |
| 1 | TiO$_2$ | 40 |
| 2 | Mg | 6 |
| 3 | TiO$_2$ | 40 |
| | Two Magnesium Films | |
| 1 | TiO$_2$ | 37 |
| 2 | Mg | 6 |
| 3 | TiO$_2$ | 72 |
| 4 | Mg | 6 |
| 5 | TiO$_2$ | 33 |

As can be seen from the above, films of magnesium metal are more reflective and more transparent than aluminum in the visible spectral region. The magnesium films of the present invention can be incorporated into a number of reflective and transmissive optical devices and filters.

The present invention has been described in terms of a number of embodiments. The invention, however, is not limited to the embodiments depicted and described. Rather, the scope of the invention is defined by the appended claims.

What is claimed is:

1. A reflector comprising: at least one layer of material including at least about 90 percent magnesium and having a reflectivity value substantially across the visible spectrum of at least about 92 percent, said layer defining a light reflecting surface.

2. A reflector comprising: at least one sputter-deposited layer of material including at least about 90 percent magnesium and having a reflectivity value across the visible spectrum of at least about 92 percent, said layer defining a light reflecting surface.

3. The reflector of claim 1 or 2 wherein said reflector is a first surface reflector.

4. The reflector of claim 1 or 2 wherein said reflector is a second surface reflector.

5. The reflector of claim 1 or 2 wherein said reflector is a dielectric enhanced reflector.

6. The reflector of claim 2 wherein said layer of magnesium is sputter-deposited in an inert gas atmosphere.

7. The reflector of claim 6 wherein said inert gas is argon.

8. A transparent, infrared reflecting composite film, comprising a transparent metal layer-dielectric layer filter wherein said metal layer is at least about 90 percent magnesium and has a reflectivity value substantially across the visible spectrum of at least about 92 percent.

9. The film of claim 8 wherein said magnesium layer is sputter-deposited in an inert ga atmosphere.

10. The film of claim 9 wherein said magnesium layer is sputter-deposited on a transparent substrate.

* * * * *

UNITED STATES PATENT AND TRADEMARK OFFICE
CERTIFICATE OF CORRECTION

PATENT NO. : 5,022,726

DATED : June 11, 1991

INVENTOR(S) : Russell Austin and Eric R. Dickey

It is certified that error appears in the above-identified patent and that said Letters Patent is hereby corrected as shown below:

Column 8, line 34, claim 9, the word spelled "ga" should be spelled "gas".

Signed and Sealed this

Sixteenth Day of February, 1993

Attest:

STEPHEN G. KUNIN

*Attesting Officer*  *Acting Commissioner of Patents and Trademarks*